June 14, 1949.   G. N. BARRERE   2,472,783
HANDLE CONTROL MECHANISM
Filed Nov. 24, 1944   2 Sheets-Sheet 2

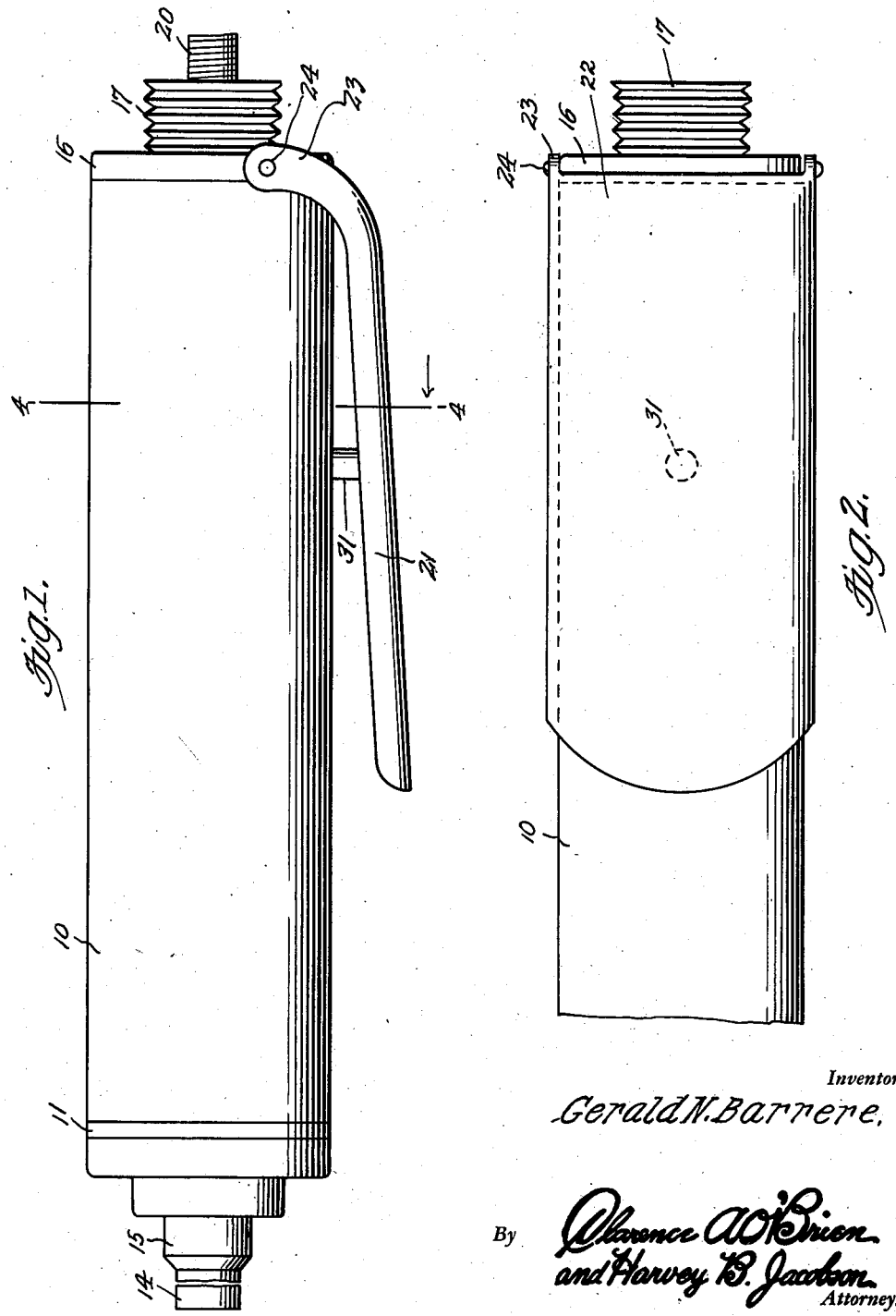

Inventor
Gerald N. Barrere.

By Clarence A. O'Brien
and Harvey B. Jacobson
Attorneys

Patented June 14, 1949

2,472,783

UNITED STATES PATENT OFFICE 2,472,783

HANDLE CONTROL MECHANISM

Gerald N. Barrere, Cincinnati, Ohio

Application November 24, 1944, Serial No. 565,018

7 Claims. (Cl. 192—93)

This invention relates to handle control mechanism, and more particularly to handle control mechanism adapted to be utilized in conjunction with tools driven by a flexible shaft or the like and to be housed within a handle for the tool.

The primary object of this invention is the provision of an improved handle control means adapted to actuate a tool driven by a flexible shaft or the like, only when firmly grasped by the hand of the user.

An additional important object is the provision of such a device which will automatically act to stop the tool when the grasp of the hand is released.

Still another object is the provision of such a device adapted to operate with a minimum of friction, thus reducing the heat generated thereby to a minimum.

Another object is to provide a control mechanism for connecting a driving shaft and a driven shaft, which is housed within a handle but operable from outside the handle, the same being so constructed as to obviate leaking of lubricating oil or grease from within the handle.

Still another object is the provision of such a device which will be reliable and efficient in operation, sturdy and durable in construction, and comparatively simple and inexpensive to manufacture and assemble.

Other objects reside in the combinations of elements, arrangements of parts, and features of construction, all as will be more fully pointed out hereinafter and disclosed in the accompanying drawings wherein there is shown a preferred embodiment of this inventive concept.

In the drawings:

Figure 1 is a side elevational view of a handle control mechanism embodying features of the instant invention.

Figure 2 is a fragmentary top plan view of the device shown in Figure 1.

Like reference numerals refer to like parts throughout the several views of the drawings.

Figure 3:
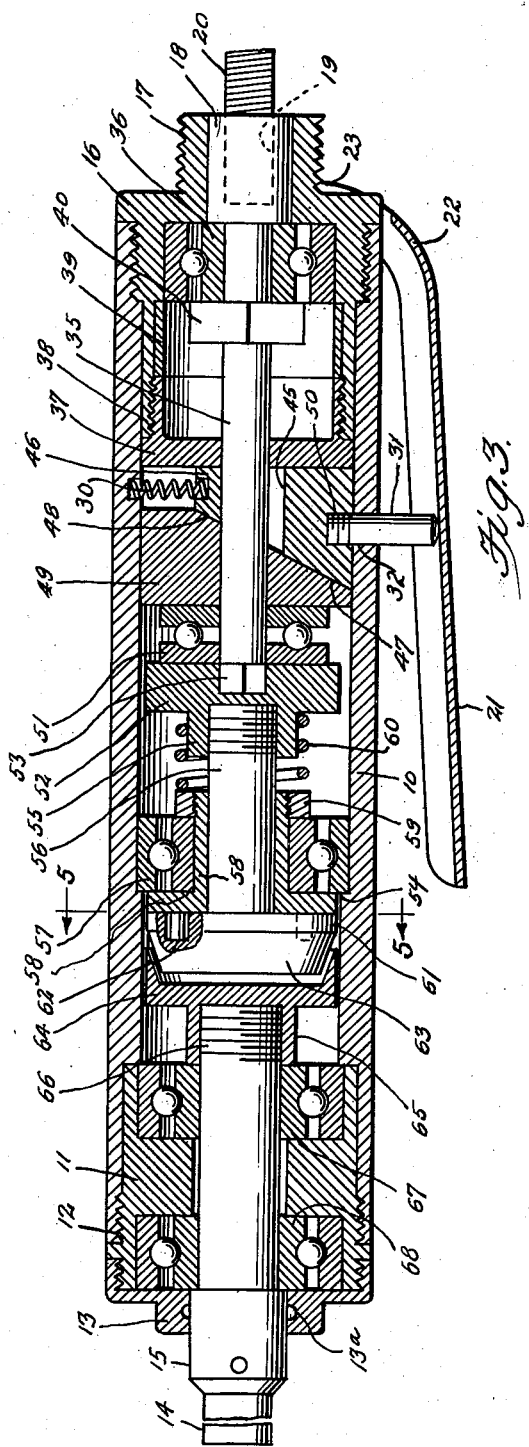
Figure 3 is a sectional view taken along the center line of the device shown in Figures 1 and 2.

Having reference now to the drawings, there is shown at 10 a housing, having a bearing retainer 11 threadedly engaged as at 12 with interior threads in the housing, and having threaded thereon a bearing cap 13 having an interior peripheral groove 13a to accommodate a felt oil seal. The end 14 of a drive shaft or spindle 15, to which is adapted to be attached any suitable tool, extends through a suitable central aperture in cap 13. The opposite end of housing 10 is provided with a cap member 16 having a threaded projection 17, on which is adapted to be mounted a closure or grease-retaining cap (not shown), and which has positioned in a suitable bore therein a rotatable shaft 18 having a threaded recess 19 therein, with which is adapted to be engaged the threaded end 20 of a flexible drive shaft or the like.

A handle member 21 terminates in parallel arcuate extending members 23 pivotally secured as on pivot pins 24 to cap member 16. Handle 21 is adapted to abut a pin 31 extending through an aperture 32 in casing 10, for a purpose to be more fully described hereinafter.

Having reference now particularly to Figure 3, it will be seen that the portion 18 comprises an integral portion of the drive shaft 35, journaled for rotation in a bearing 36, secured in position by a bearing cap 37 threadedly engaging an interiorly threaded portion 38 of cap member 16, and a spacer sleeve 39. A lock nut 40 is threaded upon a suitably threaded portion of shaft 35 and secures the same in related assembly with bearing 36.

Figure 4:
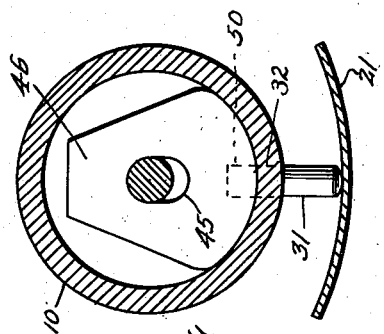
Figure 4 is a sectional view taken substantially along the line 4—4 of Figure 1.
Figure 5:
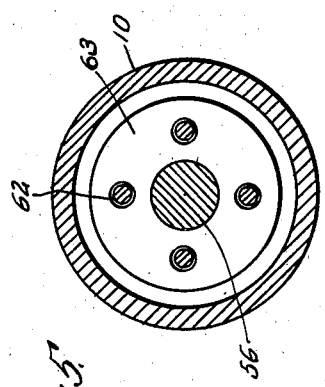
Figure 5 is a sectional view taken substantially along the line 5—5 of Figure 3 as viewed in the direction indicated by the arrows.

The shaft 35 extends through a suitable aperture in bearing cap 37, and thence through a slotted aperture 45 (see Figure 4) in a shoe 46 provided with an inclined cam surface 47 adapted to abut an oppositely inclined surface 48 formed on a second shoe 49, through a cylindrical bore in which the shaft 35 extends. A compression spring 30 having its ends seated in suitable recesses in shoe 46 and casing 10 biases shoe 46 toward pin 30, which is threaded at its extremity as at 50 and engages a suitable threaded aperture in the base of shoe 46.

A thrust bearing 51 surrounds the shaft 35 beyond shoe 49, being positioned between shoe 49 and a spindle cap 52 provided with a squared aperture in which the squared end 53 of the shaft 35 seats. Spindle cap 52 is provided with a protruding annulus 55 having a centrally disposed threaded bore, within which is threaded the extremity of an extension shaft 56 seated in a bearing 57 as through a bearing sleeve 58. Bearing 57 seats against a suitable shoulder 54 in casing 10 and lock nut 59 surrounds and is screwed on sleeve 58 in which shaft 56 is slidable.

Bearing sleeve 58 terminates in a circular plate 61 provided with a plurality of drive pins 62, adapted to engage in suitable apertures in the rear face of a male clutch member 63. A spring 60 positioned between lock nut 59 and cap 52 serves to bias shaft 56, and hence male clutch member 63, in a direction away from a female clutch member 64, provided with an annulus 65 having an interiorly threaded, centrally disposed bore, adapted to engage the threaded extremity 66 of shaft 15. The shaft 15 extends outwardly through suitable bearings 67 and 68 held in position as by bearing retainer 11, and then extends outwardly as above described and terminates in portion 14.

From the foregoing, the method of operation of the device should be readily understandable. When the handle 21 is pressed inwardly, as by the pressure of a hand surrounding casing 10, the pin 31 will be forced inwardly with respect to the housing 10 and simultaneously force the shoe 46 inwardly within the limits defined by slot 45, whereupon the inclined surface 47 engaging the inclined surface 48 of shoe 49 will force the assembly, including the spindle cap 52 and shaft 56, forwardly until clutch member 63 engages the clutch 64, which engagement will effect the drive of the tool associated with the spindle 14. However, immediately upon release of the pressure on handle 21, the spring 30 will bias the pin 31 outwardly with respect to the housing 10, simultaneously moving the shoe 46 to the position as shown in the drawing, releasing the pressure on shoe 49, serving to hold the clutch in engagement, and permit the clutch to be disengaged by spring 60, thus discontinuing the operation of the tool. It is to be noted that all parts of this control mechanism are entirely housed within the cylindrical casing 10, with the exception of pin 31 and handle lever 21, so that there are no projecting rotating elements other than the driving shaft and the driven spindle, and the mechanism is eminently safe. Furthermore, the only opening through which oil or grease could escape from the interior of housing 10, other than the openings at the ends for shaft 18 and spindle 15, is the hole 32 in which pin 31 works, and the parts of the housing, in which the bearings to be lubricated are contained, are cut off from this hole by bearing cap 37 and shoe 49, which fits slidably within housing 10. Thus leakage of oil through hole 32 is obviated.

Now, from the foregoing it will be seen that there is herein provided an improved device accomplishing all of the objects of this invention and others, including many advantages of great practical utility and commercial importance.

As many embodiments may be made of this inventive concept, and as many modifications may be made in the embodiment hereinbefore shown and described, it will be understood that all matter herein is to be interpreted merely as illustrative and not in a limiting sense.

I claim:

1. In a device of the character described in combination, a housing, a drive shaft rotatable in said housing, a spindle rotatable in said housing, a clutch between said shaft and said spindle, a handle exterior of said housing, and pivoted thereto, a pin adjacent said handle extending through said housing, and means operable by said pin to engage and disengage said clutch, said last-mentioned means including a shoe having an inclined surface, and a second shoe having an opposed inclined surface, the arrangement being such that inward movement of said pin with respect to said housing moves said first-mentioned shoe to engage said clutch.

2. In a device of the character described in combination, a housing, a drive shaft rotatable in said housing, a spindle rotatable in said housing, a clutch between said shaft and said spindle, a handle exterior of said housing, and pivoted thereto, a pin adjacent said handle extending through said housing, and means operable by said pin to engage and disengage said clutch, said last-mentioned means including a shoe having an inclined surface, a second shoe having an opposed inclined surface, the arrangement being such that inward movement of said pin with respect to said housing moves said first-mentioned shoe to engage said clutch, and resilient means biasing said pin outwardly with respect to said housing, normally to permit said clutch to be in disengaged position.

3. In a device of the character described in combination, a housing, a drive shaft rotatable in said housing, a spindle rotatable in said housing, a clutch between said shaft and said spindle, a handle exterior of said housing, and pivoted thereto, a pin adjacent said handle extending through said housing, and means operable by said pin to engage and disengage said clutch, said last-mentioned means including a shoe having an inclined surface, a second shoe having an opposed inclined surface, the arrangement being such that inward movement of said pin with respect to said housing moves said first-mentioned shoe to engage said clutch, and resilient means biasing said pin outwardly with respect to said housing, normally to permit said clutch to be in disengaged position, said last-mentioned means comprising a compression spring positioned between said first-mentioned shoe and said casing opposite said pin.

4. In a device of the character described, the combination of a housing, a drive shaft rotatable in said housing, a driven spindle rotatable in said housing, a clutch between said shaft and said spindle, and means operable from without the housing for engaging said clutch comprising a shoe movable transversely of said housing and having an inclined surface, a second shoe slidable longitudinally of said housing and having an inclined surface engaging the inclined surface of said first-mentioned shoe, means for transmitting longitudinal movement of said second shoe to said clutch to engage it, a pin secured to said first-mentioned shoe and projecting through the wall of said housing, and means, without the housing, engageable by the operator for moving said pin transversely of the axis of said housing.

5. In a device of the character described, the combination of a housing, a drive shaft rotatable in said housing, a driven spindle rotatable in said housing, a clutch between said shaft and said spindle, and means operable from without the housing for engaging said clutch, comprising a shoe movable transversely of said housing and having an inclined surface, a second shoe non-rotatable with respect to but slidable longitudinally of said housing and having an inclined surface engaging the inclined surface of said first-mentioned shoe, means for transmitting longitudinal movement of said second shoe to said clutch to engage it, and means, operable from without the housing, for moving said first-mentioned shoe transversely of the housing.

6. In a device of the character described, the combination of a housing, a drive shaft rotatable in said housing, a driven spindle rotatable in said housing, a clutch between said shaft and said spindle, a shoe movable transversely of said housing and having an inclined surface, a second shoe slidable longitudinally of said housing and having an inclined surface engaging the inclined surface of said first-mentioned shoe, means for transmitting longitudinal movement of said second shoe to said clutch to engage it, means operable from without the housing for moving said first-mentioned shoe transversely of the housing, and resilient means biasing said first-mentioned shoe to clutch-disengaging position.

7. In a device of the character described, the combination of a housing, a drive shaft rotatable in said housing, a driven spindle rotatable in said housing, a clutch between said shaft and said spindle, a shoe movable transversely of said housing and having an inclined surface, a second shoe slidable longitudinally of said housing and having an inclined surface engaging the inclined surface of said first-mentioned shoe, means for transmitting longitudinal movement of said second shoe to said clutch to engage it, means operable from without the housing for moving said first-mentioned shoe transversely of the housing, and a spring interposed between the first-mentioned shoe and the wall of the housing to bias said shoe to clutch disengaging position.

GERALD N. BARRERE.

REFERENCES CITED

The following references are of record in the file of this patent:

UNITED STATES PATENTS

| Number | Name | Date |
|---|---|---|
| 178,500 | Wuterich | June 6, 1876 |
| 880,403 | Ritchie | Feb. 25, 1908 |
| 992,375 | Moffitt | May 16, 1911 |
| 1,125,623 | Woods | Jan. 19, 1915 |
| 1,311,299 | Therien | July 29, 1919 |
| 1,877,197 | Price et al. | Sept. 13, 1932 |
| 1,999,284 | Colvin | Apr. 30, 1935 |
| 2,092,104 | Bowden | Sept. 7, 1937 |

FOREIGN PATENTS

| Number | Country | Date |
|---|---|---|
| 438,861 | Great Britain | Nov. 25, 1935 |
| 575,152 | Germany | Apr. 25, 1933 |